No. 776,775. PATENTED DEC. 6, 1904.
C. F. DIETZ.
DOUGH FORMING MACHINE.
APPLICATION FILED MAY 31, 1904.
NO MODEL.

Witnesses:
John Enders.
Harry F. Strott,

Inventor:
Christian F. Dietz,
By Dyrenforth, Dyrenforth & Lee,
Attys.

No. 776,775. Patented December 6, 1904.

UNITED STATES PATENT OFFICE.

CHRISTIAN F. DIETZ, OF CHICAGO, ILLINOIS.

DOUGH-FORMING MACHINE.

SPECIFICATION forming part of Letters Patent No. 776,775, dated December 6, 1904.

Application filed May 31, 1904. Serial No. 210,416. (No model.)

*To all whom it may concern:*

Be it known that I, CHRISTIAN F. DIETZ, a citizen of the United States, residing at Chicago, in the county of Cook and State of Illinois, have invented a new and useful Improvement in Dough-Forming Machines, of which the following is a specification.

This invention relates to an improved method of forming loaves from dough preparatory to baking them into bread and also to improvements in machines or appliances for use in carrying out the said method.

A very desirable mode of operation for forming a loaf by mechanical means is one wherein the lump of dough is subjected to a compacting operation while at the same time its skin portion is frictionally stretched, drawn toward, and applied to the side intended to form the under side of the finished loaf of bread. The loaf of dough thus formed results when baked in bread possessing characteristics which render it particularly desirable both as to quality and appearance.

My present object is to prepare loaves from lumps of dough in the general manner aforesaid, but by an improved method, which renders the forming operation quicker and less laborious and expensive than hitherto.

It is also my object to provide a machine of simple construction for practicing my improved method.

In the accompanying drawings I show a machine of one desirable and particularly simple type which will operate upon lumps of dough to form them into loaves in accordance with my present method.

Figure 1:
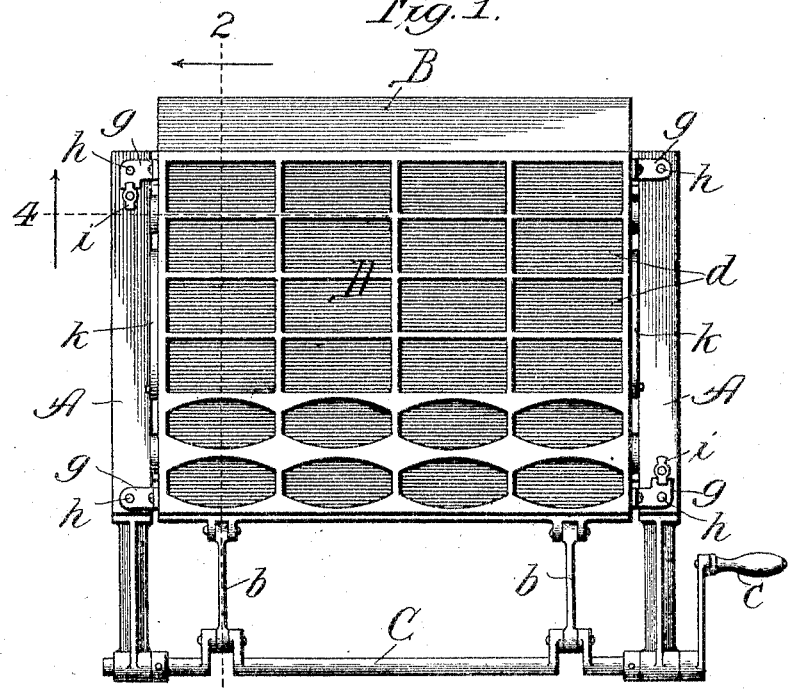
Figures 2, 3:
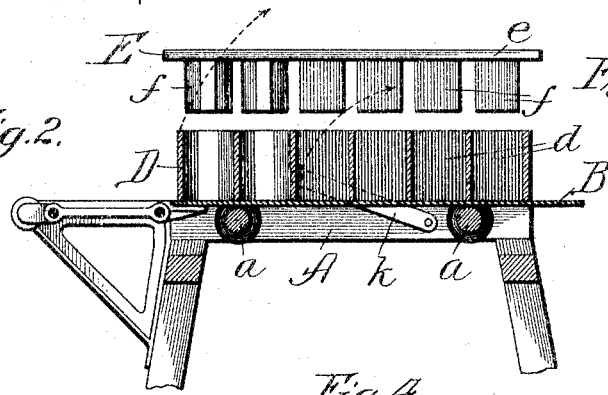
Figure 4:
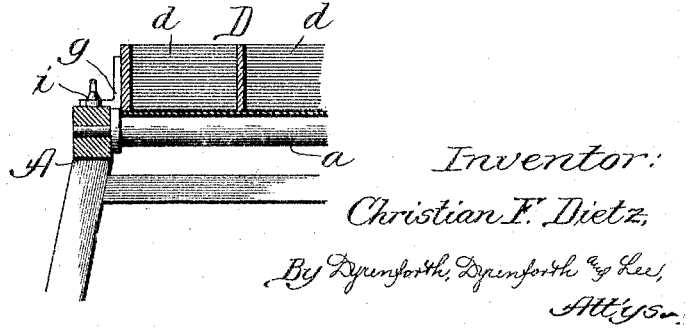

Referring to the drawings, Figure 1 is a top plan view of a machine showing, for purposes of illustration, means for forming loaves of two different types both non-circular in horizontal cross-section; Fig. 2, a broken section taken on line 2 in Fig. 1; Fig. 3, a section of a dough-compressing plunger attachment or adjunct, the section being taken on a line corresponding with line 2 in Fig. 1; and Fig. 4, a broken section taken on line 4 in Fig. 1.

A is a support or stand, in the upper part of which are journaled rollers $a\, a$. Resting upon the rollers $a$ is a reciprocating platform B, presenting at its upper side a friction-surface. The platform is connected, by means of pitmen $b\, b$, with a crank-shaft C, having an operating-handle $c$.

Supported upon the stand A above the platform B is a stationary frame D, formed with a series of receptacles or compartments $d$, open at the top and bottom and which may be rectangular or tapering at opposite ends, as illustrated in Fig. 1, or of any other desirable form. The machine, as illustrated, is adapted to form simultaneously sixteen loaves of dough rectangular in horizontal cross-section and eight loaves of the Vienna type, tapering toward opposite ends.

In operation lumps of dough of suitable size are deposited in the compartments $d$, and, if desired, they may all be subjected to pressure from above to force them into intimate contact over a comparatively wide surface with the platform B, which crosses the bases of the compartments. To facilitate this compressing operation, the plunger device E may be employed. It consists of a board $e$, provided on its under side with blocks $f$, which when the plunger is lowered enter the compartments $d$ and press the lumps of dough against the platform. The plunger may then be raised out of the compartments. Turning of the handle $c$ causes the platform B to be reciprocated back and forth, whereby each lump of dough is first forced against one wall of the compartment and then against the opposite wall thereof. As a lump owing to its engagement with the friction-surface of the platform is drawn in one direction and forced against one compartment-wall the further travel of the platform in the same direction tends to frictionally draw and stretch the skin portion of the lump from one side toward the under side of the lump. In the reverse movement of the platform, which forces the lump against the opposite compartment-wall, the skin portion at the opposite side of the lump is stretched and drawn toward its under side. The skin portion thus drawn first from one side and then the other is applied naturally to the under side of the lump, and the repeated operations against one and then the other side cause the skin portion at all parts to be stretched and in the stretching operation to compact the loaf. Those lumps which are operated upon, and consequently shaped in the rectangular compartments, will result in loaves rectangular in horizontal cross-section, while those operated upon in the tapered compartments will result in loaves of the "Vienna" shape. If desired, the plunger device E may be caused to remain in its lowered position during the forming operation to maintain better frictional contact between the lumps and platform. Obviously the same results in the formation of the loaves would be produced if the frame D were connected with and reciprocated by the shaft C and the platform B were disconnected therefrom and caused to remain stationary.

Any suitable means may be provided for readily removing the loaves, when formed, all at one time or otherwise. In the drawings I have shown perforated ears $g$ at the four corners of the frame D adapted to rest upon the surface of the stand A around steadying and positioning pins $h$. Pivotal latches $i$ are provided upon the stand A to engage the ears $g$ and hold the frame firmly in place. The frame is connected by links $k$ with the stand at opposite sides, whereby when freed by the latches $i$ it may be raised, as indicated by the dotted circles, to give ready access to the loaves and facilitate their removal. As illustrated in the drawings, the plunger device E would be lifted bodily by hand in moving it into and out of position; but it would be an easy matter to provide any convenient form of mechanism for operating it.

The construction shown and described may be modified in many ways, as desired, without departing from the spirit of my invention as defined by the claim.

What I claim as new, and desire to secure by Letters Patent, is—

The herein-described method of forming a loaf from a lump of dough, which consists in frictionally engaging the lump at its under side and subjecting it alternately at opposite lateral sides to pressure to produce reciprocating frictional drawing action against said under side, thereby stretching the skin portion of the dough toward said under side applying the surplus to said under side and compacting the lump.

CHRISTIAN F. DIETZ.

In presence of—
WALTER N. WINBERG,
ALIMA W. THORIEU.